US008976295B2

(12) United States Patent
Chun

(10) Patent No.: US 8,976,295 B2
(45) **Date of Patent: *Mar. 10, 2015**

(54) METHOD OF LINKAGE-VIEWING TV BROADCASTING PROGRAM BETWEEN MOBILE COMMUNICATION APPARATUS AND DIGITAL TV, AND MOBILE COMMUNICATION APPARATUS AND DIGITAL TV THEREOF

(75) Inventor: Min-kyung Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

This patent is subject to a terminal disclaimer.

(21) Appl. No.: 13/480,128

(22) Filed: May 24, 2012

(65) Prior Publication Data

US 2012/0236208 A1 Sep. 20, 2012

Related U.S. Application Data

(63) Continuation of application No. 11/875,262, filed on Oct. 19, 2007, now Pat. No. 8,233,090.

(30) Foreign Application Priority Data

Feb. 14, 2007 (KR) ........................ 10-2007-0015605

(51) Int. Cl.
*H04N 7/00* (2011.01)
*H04H 60/80* (2008.01)
*H04H 40/18* (2008.01)

(52) U.S. Cl.
CPC ............... *H04H 60/80* (2013.01); *H04H 40/18* (2013.01)
USPC .......................................................... 348/552

(58) Field of Classification Search
USPC .......... 348/725, 552, 553, 556, 557; 725/133, 725/142; 455/557, 66.1, 556.1
See application file for complete search history.

(56) References Cited

U.S. PATENT DOCUMENTS 6,781,635 B1 * 8/2004 Takeda .......................... 348/552
7,376,441 B2 * 5/2008 Lee ............................ 455/556.1

(Continued)

FOREIGN PATENT DOCUMENTS

CN 1505375 A 6/2004
CN 1612603 A 5/2005

(Continued)

OTHER PUBLICATIONS

Daisaku Komiya Xu Mingqiang Eunsoo Shim Panasonic, "Use Cases for Session Mobility in Multimedia Applications ; draft-komiya-mmusic-session-mobility-usecases-00.txt", IETF Standard-Working-Draft, Internet Engineering Task Force, IETF, CH, Feb. 27, 2006, XP015044303, ISSN: 0000-0004.

(Continued)

*Primary Examiner* — Paulos M Natnael
(74) *Attorney, Agent, or Firm* — Sughrue Mion, PLLC

(57) ABSTRACT

A method of linkage-viewing a TV broadcasting program between a mobile communication apparatus and a digital TV, the method includes inputting a TV linkage-viewing command in order to successively view a TV broadcasting program which is being viewed on the mobile communication apparatus, on the digital TV; transmitting data information from the mobile communication apparatus to the digital TV according to the input of the TV linkage viewing command; and selecting a TV channel in the digital TV which is the same as a current channel which is being viewed on the mobile communication apparatus and changing to the selected TV channel based on the data information which the digital TV has received.

29 Claims, 6 Drawing Sheets

(56) References Cited

U.S. PATENT DOCUMENTS

| | | | | |
|---|---|---|---|---|
| 7,835,505 | B2 * | 11/2010 | Toyama et al. | 379/90.01 |
| 2003/0040334 | A1 | 2/2003 | Lee | |
| 2005/0262548 | A1 * | 11/2005 | Shimojo et al. | 725/135 |

FOREIGN PATENT DOCUMENTS

| | | | |
|---|---|---|---|
| CN | 1805570 | A | 7/2006 |
| CN | 1874473 | A | 12/2006 |
| EP | 1 667 411 | A1 | 6/2006 |
| JP | 2004048132 | A | 2/2004 |
| JP | 2005-333371 | A | 12/2005 |
| JP | 2006-005897 | A | 1/2006 |
| JP | 2006041821 | A | 2/2006 |
| KR | 10-2003-0017181 | A | 3/2003 |
| KR | 10-2005-0059717 | A | 6/2005 |
| KR | 10-2006-0018480 | A | 3/2006 |
| KR | 10-2006-0066312 | A | 6/2006 |

OTHER PUBLICATIONS

Communication dated Feb. 23, 2012, issued by the European Patent Office in counterpart European Application No. 08100717.1.

Communication dated Dec. 21, 2011, issued by the Korean Intellectual Property Office in counterpart Korean Application No. 10-2007-0015605.

Mate, S., et al., "Moveable-Multimedia: Session Mobility in Ubiquitous Computing Ecosystem", MUM 2006 International Conference on Mobile and Ubiquitous Multimedia, Dec. 4, 2006.

Extended European Search Report issued Jul. 4, 2011 in counterpart European Application No. 08100717.1.

Communication dated Aug. 3, 2011 from the State Intellectual Property Office of P.R. China in a counterpart application No. 200810005611.X.

Communication, dated Mar. 24, 2014, issued by the State Intellectual Property Office of the People's Republic of China in counterpart Chinese Application No. 201210083941.7.

Communication dated Aug. 26, 2013, issued by the European Patent Office in counterpart European Application No. 08 100 717.1.

Communication, Issued by the State Intellectual Property Office of P.R. China, Dated Sep. 10, 2014, in counterpart Chinese Application No. 201210083941.7.

Communication, Issued by the European Patent Office, Dated Jul. 30, 2014, in counterpart European Application No. 08 100 717.1.

* cited by examiner

METHOD OF LINKAGE-VIEWING TV BROADCASTING PROGRAM BETWEEN MOBILE COMMUNICATION APPARATUS AND DIGITAL TV, AND MOBILE COMMUNICATION APPARATUS AND DIGITAL TV THEREOF

CROSS-REFERENCE TO RELATED APPLICATIONS

This application is a continuation application of application Ser. No. 11/875,262, filed Oct. 19, 2007, which claims priority from Korean Patent Application No. 10-2007-0015605, filed on Feb. 14, 2007 in the Korean Intellectual Property Office, the disclosure of which is incorporated herein by reference.

BACKGROUND OF THE INVENTION

1. Field of the Invention

Apparatuses and methods consistent with the present invention relate to a mobile communication apparatus and a digital television (TV), and more particularly, to a method of linkage-viewing a TV broadcasting program between a mobile communication apparatus and a digital TV, and a mobile communication apparatus and a digital TV which enable a user to successively view a TV broadcasting program there between.

2. Description of the Related Art

Today, many people are using cellular phones, and can watch TV broadcasting programs through cellular phones due to technological development of cellular phones. Since it is possible to view TV broadcasting programs using cellular phones, people can watch TV broadcasting programs anytime, anywhere, with cellular phones enabling people to view TV broadcasting programs, for example, digital multimedia broadcasting (DMB) phones.

When a user moves to a place where a digital TV exists while he or she watches a TV broadcasting program on a DMB phone and wants to successively watch, on the digital TV, the TV broadcasting program which he or she is watching on the DMB phone, he or she must terminate, as illustrated in FIG. 1, watching on the DMB phone 110 at first and then operate the digital TV 120 manually, because a control means which can intercommunicate between the DMB phone 110 and the digital TV 120, or between the DMB phone 110 and a remote control unit 130 is not provided. That is, the user uses the remote control unit 130 or manually presses an electric power switch of the digital TV directly to turn on the digital TV if the digital TV 120 is in a status of power off. Then, the user operates a channel changeover switch (ordinarily manipulates a channel changeover switch provided in the remote control unit) to find a corresponding channel. Here, the user locates the remote control unit, and determines a corresponding channel to then manipulate the channel changeover switch. This procedure is inconvenient and time-consuming, particularly because there are a greater number of channels in a digital TV than an analog TV. Accordingly, a longer time is required for a user to successively watch the TV broadcasting program viewed on a cellular phone, on a digital TV. Therefore, the user may miss a part of the relevant program, or the TV broadcasting program may be ended to thus cause the user not to watch it any more.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, it is an aspect of the present invention to provide a method of linkage viewing a TV broadcasting program between a mobile communication apparatus and a digital TV, in which a user can successively watch a TV broadcasting program which is being viewed on the mobile communication apparatus by linking the TV program to the digital TV without any special manipulation of the user.

It is another aspect of the present invention to provide a method of linkage viewing a TV broadcasting program between a mobile communication apparatus and a digital TV, in which a user can successively watch a TV broadcasting program which is being viewed on the digital TV by linking the TV broadcasting program to the mobile communication apparatus without any special manipulation of the user.

It is still another aspect of the present invention to provide a mobile communication apparatus which enables a user to successively watch a TV broadcasting program which is being viewed on the mobile communication apparatus by linking the TV broadcasting program to a digital TV without any special manipulation of the user.

It is yet another aspect of the present invention to provide a digital TV which enables a user to successively watch a TV broadcasting program which is being viewed on the digital TV by linking the TV broadcasting program to a mobile communication apparatus without any special manipulation of the user.

The foregoing and/or other aspects of the present invention are achieved by providing a method of linkage-viewing a TV broadcasting program between a mobile communication apparatus and a digital TV, the method including: inputting a TV linkage-viewing command in order to successively watch a TV broadcasting program which is being viewed on the mobile communication apparatus, on the digital TV; transmitting data information from the mobile communication apparatus to the digital TV according to the input of the TV linkage viewing command; and selecting a TV channel in the digital TV which is the same as a current channel which is being viewed on the mobile communication apparatus and changing to the selected TV channel based on the data information which the digital TV has received.

According to an aspect of the present invention, the inputting the TV linkage viewing command is achieved using a TV linkage-viewing button which is provided in the mobile communication apparatus.

According to an aspect of the present invention, the inputting the TV linkage-viewing command is achieved using a mobile communication apparatus linkage-viewing button which is provided in the digital TV.

According to an aspect of the present invention, the method of linkage-viewing a TV broadcasting program between a mobile communication apparatus and a digital TV further includes judging whether the digital TV is in a state of power on before the TV channel selecting and changing operation is performed, wherein if the digital TV is in power on state, the TV channel is selected and changed to the same channel as the current channel which is being viewed on the mobile communication apparatus, and if the digital TV is in power off state, the digital TV is made to be power on.

According to an aspect of the present invention, the data information includes program information and a signal which turns on/off power of the digital TV.

According to an aspect of the present invention, the program information includes at least one of broadcasting station information and a channel number.

The foregoing and/or other aspects of the present invention are achieved by providing a method of linkage-viewing a TV broadcasting program between a mobile communication apparatus and a digital TV, the method including: inputting a mobile communication apparatus linkage-viewing command in order to successively watch a TV broadcasting program which is being viewed on the digital TV, on the mobile communication apparatus; transmitting data information from the digital TV to the mobile communication apparatus according to the input of the mobile communication apparatus linkage-viewing command; and selecting a channel in the mobile communication apparatus which is the same as a current TV channel which is being viewed on the digital TV and changing to the selected channel based on the data information which the mobile communication apparatus has received.

According to an aspect of the present invention, the inputting the mobile communication apparatus linkage-viewing command is achieved using a mobile communication apparatus linkage-viewing button which is provided in the digital TV.

According to an aspect of the present invention, the inputting the mobile communication apparatus linkage-viewing command is achieved using a TV linkage-viewing button which is provided in the mobile communication apparatus.

According to an aspect of the present invention, the method of linkage-viewing a TV broadcasting program between a mobile communication apparatus and a digital TV further includes judging whether the mobile communication apparatus is executing a DMB program before the channel selecting and changing operation is performed, wherein if the mobile communication apparatus is executing the DMB program, the channel is selected and changed to the same channel as the current TV channel which is being viewed on the digital TV, and if the mobile communication apparatus is not executing the DMB program, the mobile communication apparatus is made to execute the DMB program.

According to an aspect of the present invention, the data information includes program information and a signal which causes the mobile communication apparatus to go into a TV broadcasting viewing mode.

According to an aspect of the present invention, the program information includes at least one of broadcasting station information and a channel number.

The foregoing and/or other aspects of the present invention are achieved by providing a mobile communication apparatus including: a display unit; an input unit which inputs a TV linkage-viewing command in order to successively watch a TV broadcasting program which is being viewed via the display unit on the mobile communication apparatus, on the digital TV, or a mobile communication apparatus linkage-viewing command in order to successively watch a TV broadcasting program which is being viewed on the digital TV, on the mobile communication apparatus; a transmission unit which transmits data information from the mobile communication apparatus to the digital TV according to the input of the TV linkage-viewing command or the mobile communication apparatus linkage-viewing command by the input unit; a reception unit which receives the data information from the digital TV according to the input of the mobile communication apparatus linkage-viewing command by the input unit; and a controller which controls the transmission unit to transmit the data information from the mobile communication apparatus to the digital TV, and controls the TV channel to be selected and changed to the same channel as a current TV channel which is being viewed on the digital TV, based on the data information which has been received through the reception unit.

According to an aspect of the present invention, the input unit includes an existing button provided in the mobile communication apparatus.

According to an aspect of the present invention, the input unit includes a separate unit independently from an existing button provided in the mobile communication apparatus.

The foregoing and/or other aspects of the present invention are achieved by providing a digital TV including: a digital TV main body having a display unit; an input unit which inputs a mobile communication apparatus linkage-viewing command in order to successively watch a TV broadcasting program which is being viewed via the display unit on the digital TV, on the mobile communication apparatus, or a TV linkage-viewing command in order to successively watch a TV broadcasting program which is being viewed on the mobile communication apparatus, on the digital TV; a communication unit which transmits and receives data information; and a controller which controls the communication unit to transmit and receive the data information according to the mobile communication apparatus linkage-viewing command or TV linkage-viewing command via the input unit, and controls to select and change a TV channel of the digital TV based on the data information which has been received through the communication unit.

According to an aspect of the present invention, the input unit is provided in the digital TV main body.

According to an aspect of the present invention, the digital TV further includes a remote control unit to wirelessly control the digital TV main body, wherein the input unit is provided in the remote control unit.

According to an aspect of the present invention, the input unit includes an existing button provided in the remote control unit.

According to an aspect of the present invention, the input unit includes a separate unit independently from an existing button provided in the remote control unit.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
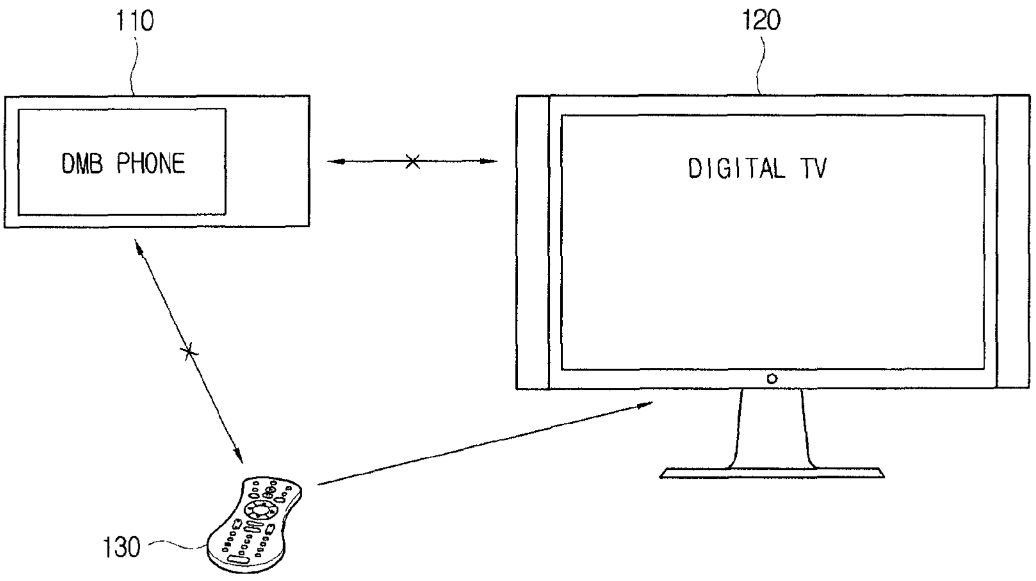
FIG. 1 (RELATED ART)
FIG. 1 is a diagram schematically illustrating a conventional communication-incapable state between a mobile communication apparatus and a digital TV.

Reference will now be made in detail to exemplary embodiments of the present invention, examples of which are illustrated in the accompanying drawings, wherein like reference numerals refer to like elements throughout. The exemplary embodiments are described below in order to explain the present invention by referring to the figures.

Figure 2:
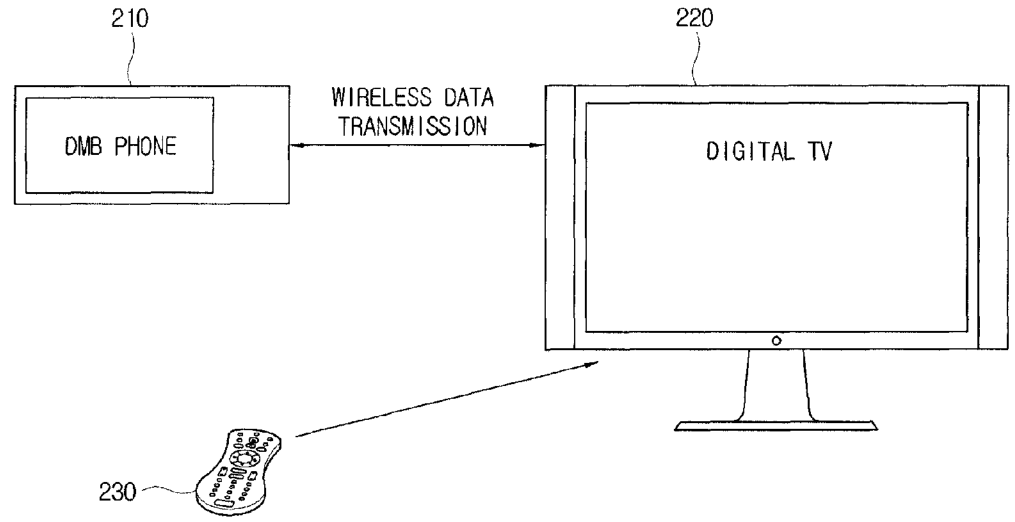
FIG. 2 is a diagram schematically illustrating a TV broadcasting program linkage-viewing mechanism between a mobile communication apparatus and a digital TV according to an exemplary embodiment of the present invention.
Figure 3A:
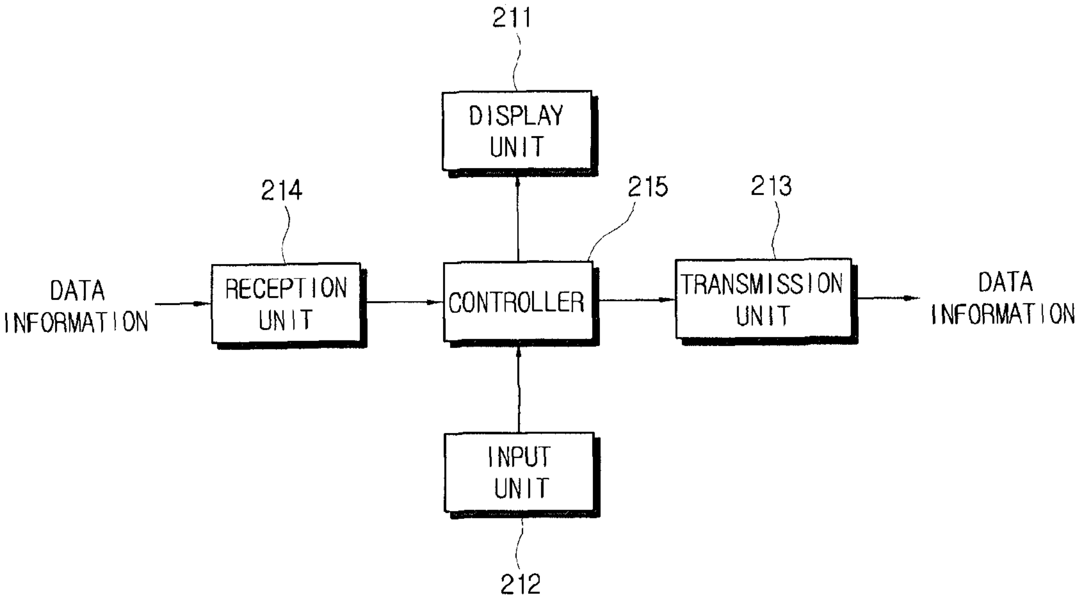
FIG. 3A is a block diagram schematically illustrating a configuration of a mobile communication apparatus according to an exemplary embodiment of the present invention.
Figure 3B:
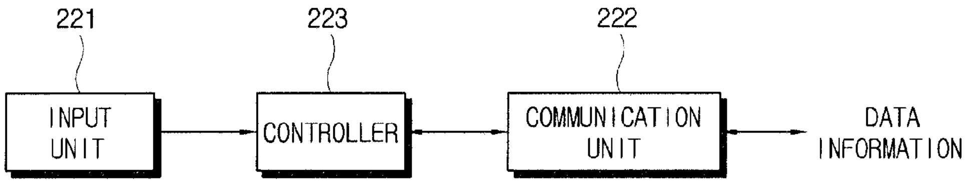
FIG. 3B is a block diagram schematically illustrating a configuration of a digital TV according to an exemplary embodiment of the present invention.

FIG. 2 is a diagram schematically illustrating a TV broadcasting program linkage-viewing mechanism between a mobile communication apparatus and a digital TV according to an exemplary embodiment of the present invention. FIG. 3A is a block diagram schematically illustrating a configuration of a mobile communication apparatus according to an exemplary embodiment of the present invention. FIG. 3B is a block diagram schematically illustrating a configuration of a digital TV according to an exemplary embodiment of the present invention.

Referring to FIGS. 2, 3A and 3B, a mobile communication apparatus (for example, a digital multimedia broadcasting (DMB) phone) 210 according to an exemplary embodiment of the present invention includes a display unit 211, an input unit 212, a transmission unit 213, and a reception unit 214 and a controller 215.

The display unit 211 displays figures, characters, or images thereon, as in a case of a general mobile communication apparatus.

A TV linkage-viewing command is input to the input unit 212 in order to successively watch a TV broadcasting program which is being viewed via the display unit 211 on the mobile communication apparatus 210, on a digital TV 220, or a mobile communication apparatus linkage-viewing command is input to the input unit 212 in order to successively watch a TV broadcasting program which is being viewed on the digital TV 220, on the mobile communication apparatus 210.

The input unit 212 may be implemented by at least one existing button provided in the mobile communication apparatus 210, or may be implemented by at least one separate unit independently from the existing button provided in the mobile communication apparatus 210.

That is, the input unit 212 may be embodied into any buttons among digit buttons and other functional buttons which are provided in the existing mobile communication apparatuses, or embodied into separate buttons independently from the existing units provided in the mobile communication apparatus 210.

The transmission unit 213 transmits data information from the mobile communication apparatus 210 to the digital TV 220 according to the input of the TV linkage-viewing command or the mobile communication apparatus linkage-viewing command by the input unit 212.

The reception unit 214 receives data information from the digital TV 220 according to the input of the mobile communication apparatus linkage-viewing command by the input unit 212.

The controller 215 controls the transmission unit 213 to transmit data information from the mobile communication apparatus 210 to the digital TV 220, and controls the mobile communication apparatus 210 to select and change a channel of the mobile communication apparatus 210 to the same channel as a current TV channel which is being viewed on the digital TV 220, based on the data information which has been received through the reception unit 214.

In addition, a digital TV 220 according to an exemplary embodiment of the present invention includes a TV main body, an input unit 221, a communication unit 222 and a controller 223. The digital TV 220 may further include a remote control unit 230 to wirelessly control the TV main body 220.

The TV main body 220 may include a display unit in an integrated form as in the case of a general digital TV.

A mobile communication apparatus linkage-viewing command is input to the input unit 221 in order to successively watch a TV broadcasting program which is being viewed on the digital TV 220, on the mobile communication apparatus 210 provided with a TV linkage-viewing button, or a TV linkage-viewing command is input to the input unit 221 in order to successively watch a TV broadcasting program which is being viewed on the mobile communication apparatus 210, on the digital TV 220.

Here, the input unit 221 may be provided in the digital TV main body, or may be provided in the remote control unit 230 to wirelessly control the digital TV main body.

In addition, the input unit 221 may be implemented by at least one existing button provided in the remote control unit 230, or may be implemented by at least one separate unit independently from the existing button provided in the remote control unit 230.

The controller 223 controls the communication unit 222 to transmit and receive the data information according to the mobile communication apparatus linkage-viewing command or TV linkage-viewing command via the input unit 221, and controls a TV channel of the digital TV to be selected and changed to the same channel as the currently viewed channel of the mobile communication apparatus 210, based on the data information which has been received through the communication unit 222.

A TV broadcasting program linkage-viewing method between a mobile communication apparatus and a digital TV will be described below in detail with reference to FIGS. 4 and 5, according to an exemplary embodiment of the present invention for the mobile communication apparatus and the digital TV having the above-described configuration.

Figure 4:
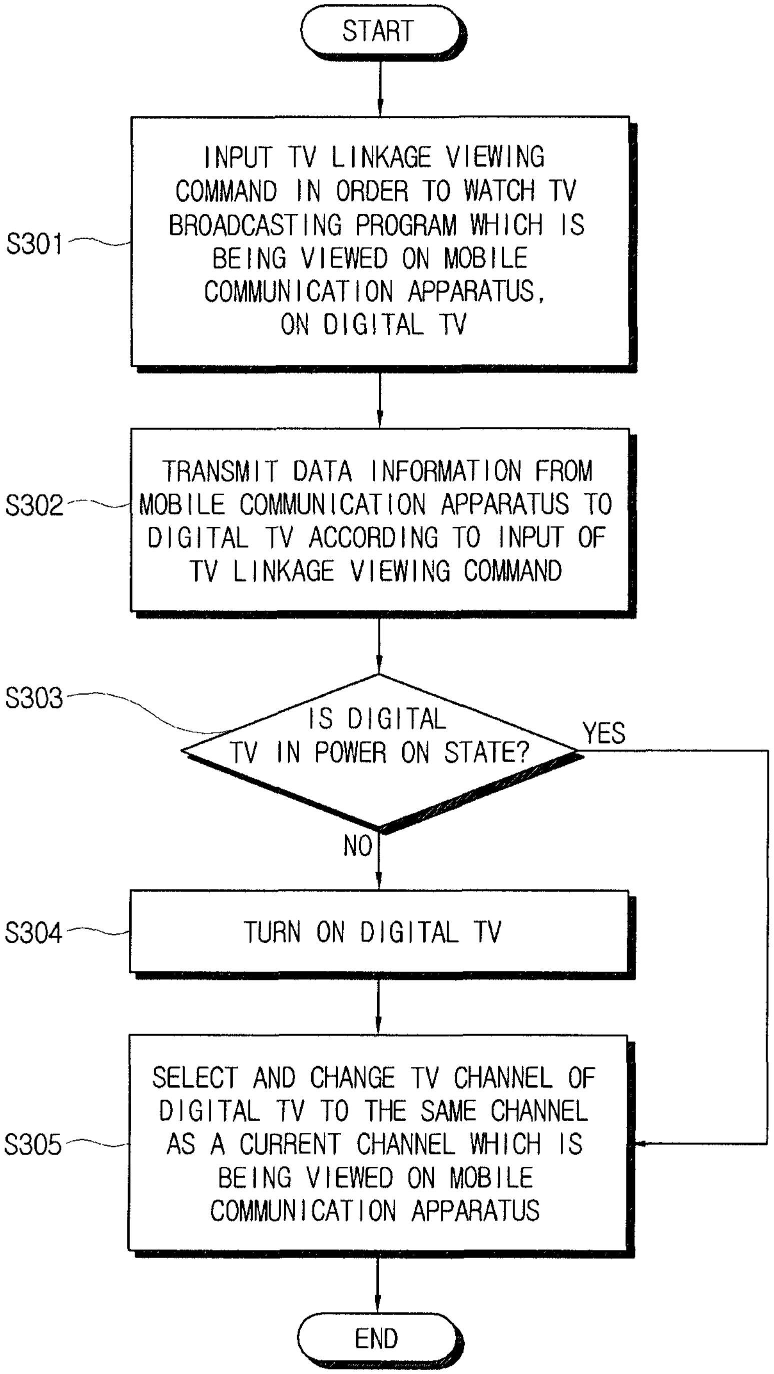
FIG. 4 is a flowchart illustrating an execution process of a TV broadcasting program linkage-viewing method between a mobile communication apparatus and a digital TV according to an exemplary embodiment of the present invention.

FIG. 4 is a flowchart illustrating an execution process of a TV broadcasting program linkage-viewing method between a mobile communication apparatus and a digital TV according to an exemplary embodiment of the present invention.

Referring to FIG. 4, a method of linkage watching a TV broadcasting program which is being viewed on a mobile communication apparatus 210 by linking the TV broadcasting program to a digital TV 220 will be described. In order to successively watch a TV broadcasting program which is being viewed on a mobile communication apparatus 210, on a digital TV 220, a user inputs a TV linkage-viewing command (S301). Here, the user uses a TV linkage-viewing button (not shown) provided in the mobile communication apparatus 210, for example, by pressing a button, or a mobile communication apparatus linkage-viewing button provided in the digital TV 220, to thus input the TV linkage-viewing command.

When the TV linkage-viewing command is input, the controller 215 of the mobile communication apparatus 210 transmits wireless data information from the mobile communication apparatus 210 to the digital TV 220 through a transmission unit 213 (S302). The data information may include program information and a signal which turns on/off electric power of the digital TV 220. In addition, the program information may include at least one of broadcasting station information and a channel number.

When wireless data information is transmitted from the mobile communication apparatus 210 to the digital TV 220, the controller 223 of the digital TV 220 judges whether or not the digital TV 220 is in a state of power on or off (S303). In this judgment, if electric power of the digital TV 220 is in the state of power on, the controller 223 selects and changes a TV channel of the digital TV to the same channel as a current channel which is being viewed on the mobile communication apparatus 210, based on data information which has been received (S305). If electric power of the digital TV 220 is in the state of power off in the judgment result of operation S303, the digital TV 220 is made to be turned on (S304). Then, the controller 223 selects and changes the TV channel to the same channel as the current channel which is being viewed on the mobile communication apparatus 210 as described above.

As described above, the user can successively watch a TV broadcasting program which is being viewed on the mobile communication apparatus 210, on a digital TV 220, by simply handling a TV linkage-viewing button which is provided in the mobile communication apparatus 210.

Figure 5:
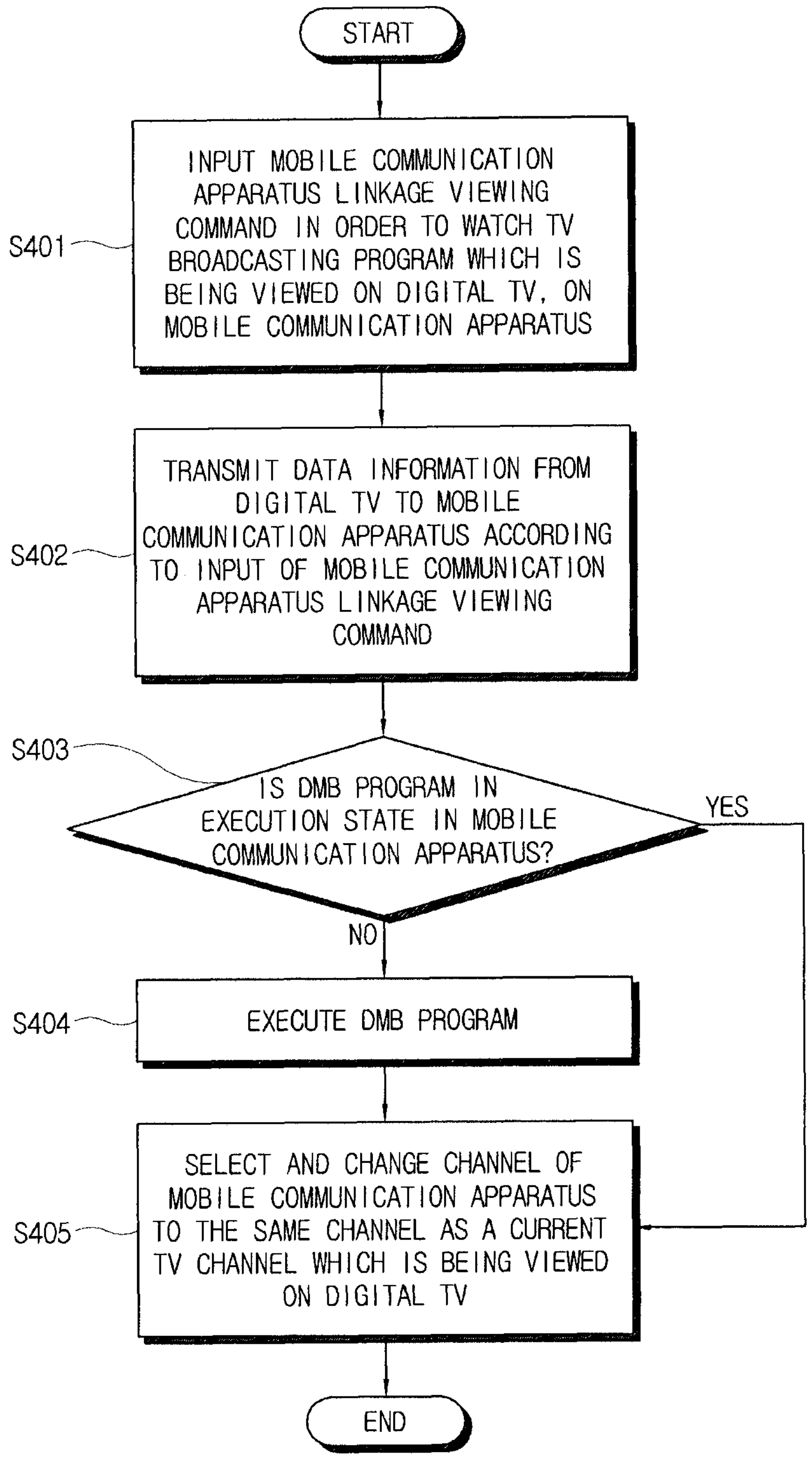
FIG. 5 is a flowchart illustrating an execution process of a TV broadcasting program linkage-viewing method between a mobile communication apparatus and a digital TV according to another exemplary embodiment of the present invention.

FIG. 5 is a flowchart illustrating an execution process of a TV broadcasting program linkage-viewing method between a mobile communication apparatus and a digital TV according to another exemplary embodiment of the present invention.

Referring to FIG. 5, a method of linkage watching a TV broadcasting program which is being viewed on a digital TV 220 by linking the TV broadcasting program to a mobile communication apparatus 210 will be described. In order to successively watch a TV broadcasting program which is being viewed on a digital TV 220, on a mobile communication apparatus 210, a user inputs a mobile communication apparatus linkage-viewing command (S401). Here, the user uses a mobile communication apparatus linkage-viewing button (not shown) provided in the digital TV 220, for example, the TV main body or a remote control unit, or a TV linkage-viewing button provided in the mobile communication apparatus 210, to thus input the mobile communication apparatus linkage-viewing command.

Thus, when the mobile communication apparatus linkage-viewing command is input, the controller 223 of the digital TV 220 transmits data information, that is, wireless data information, from the digital TV 220 to the mobile communication apparatus 210 through a communication unit 222 (S402). The data information may include program information and a signal which makes the mobile communication apparatus go into the TV broadcasting viewing mode. In addition, the program information may include at least one of broadcasting station information and a channel number.

As described above, when wireless data information is transmitted from the digital TV 220 to the mobile communication apparatus 210, the controller 215 of the mobile communication apparatus 210 judges whether or not the mobile communication apparatus 210 executes a DMB program (S403). In this judgment, if the DMB program has been executed, the controller 215 selects and changes a channel of the mobile communication apparatus to the same channel as a current TV channel which is being viewed on the digital TV 220, based on data information which has been received (S405). If the DMB program has not been yet executed in the mobile communication apparatus 210 in the judgment result of operation S403, the DMB program is made to be executed (S404). Then, the controller 215 selects and changes the channel to the same channel as the current TV channel which is being viewed on the digital TV 220 as described above.

As described above, the user can watch a TV broadcasting program which is being viewed on the digital TV 220, on the mobile communication apparatus 210, by simply handling a mobile communication apparatus linkage-viewing button which is provided in the digital TV 220.

As described above, the present invention provides a method of linkage viewing a TV broadcasting program between a mobile communication apparatus and a digital TV, in which a user can successively watch a TV broadcasting program which is being viewed on the mobile communication apparatus, on the digital TV, or successively watch a TV broadcasting program which is being viewed on the digital TV, on the mobile communication apparatus, by simply handling a TV linkage-viewing button provided in the mobile communication apparatus, or a mobile communication apparatus linkage-viewing button provided in the digital TV.

Although a few exemplary embodiments of the present invention have been shown and described, the present invention is not limited thereto, but it will be appreciated by those skilled in the art that various modifications may be made in these exemplary embodiments without departing from the principles and spirit of the invention, the scope of which is defined in the appended claims and their equivalents.

What is claimed is:

1. A method of controlling a TV for linkage-viewing a program between a mobile communication apparatus and the TV, the method comprising:

controlling a tuner of the TV to receive a signal of a TV channel;

displaying a program of the TV channel on the TV based on the received signal;

receiving a linkage-viewing command in order to linkage view the program which is being viewed on the TV;

transmitting information on the program to the mobile communication apparatus in connection with the linkage viewing command such that the mobile communication apparatus selects a TV channel corresponding to a current channel on which the program is being viewed on the TV based on the transmitted information to display an image based on a signal which is received at the selected TV channel.

2. The method according to claim 1, wherein the receiving comprises receiving the linkage viewing command through the mobile communication apparatus.

3. The method according to claim 1, further comprising receiving a signal from the mobile communication apparatus when the TV is in a state of power off, and turning on power of the TV based on the received signal.

4. The method according to claim 1, wherein the information comprises at least one of broadcasting station information and a channel number.

5. A method of controlling a mobile communication apparatus for linkage-viewing a program between the mobile communication apparatus and a TV, the method comprising:

receiving a linkage-viewing command in order to linkage view an image corresponding to a program which is being displayed on the TV; and receiving information on the program from the TV in connection with the linkage-viewing command;

selecting a TV channel corresponding to a current channel on which the program is being displayed on the TV based on the received information, and displaying the image on the selected TV channel.

6. The method according to claim 5, wherein the receiving the linkage-viewing command comprises receiving the linkage-viewing command through the TV.

7. The method according to claim 5, further comprising transmitting a signal to the TV to turn on power of the TV if the TV is in a state of power off.

8. The method according to claim 5, wherein the information comprises at least one of broadcasting station information and a channel number.

9. A mobile communication apparatus comprising:

a receiving unit; and a controller which determines whether a linkage-viewing command is received in order to linkage view an image corresponding to a program which is being displayed on the TV, and controls the receiving unit to receive information on the program from a TV in connection with the linkage viewing command and to select a TV channel corresponding to a current channel on which the program is being displayed on the TV based on the received information to display the image on the selected TV channel.

10. The mobile communication apparatus according to claim 9, further comprising an input unit which receives the linkage-viewing command.

11. The mobile communication apparatus according to claim 9, wherein the controller determines whether the linkage-viewing command is received through the TV.

12. The mobile communication apparatus according to claim 9, further comprising a transmitting unit to transmit a signal to the TV to turn on power of the TV if the TV is in a state of power off.

13. The mobile communication apparatus according to claim 9, wherein the information comprises at least one of broadcasting station information and a channel number.

14. A TV comprising:

a TV main body having a display unit;

a communication unit which communicates with a mobile communication apparatus; and a controller which determines whether a linkage-viewing command is received in order to linkage view a program which is being viewed on the TV, controls the communication unit to transmit information on the program to the mobile communication apparatus in connection with the linkage-viewing command such that the mobile communication apparatus selects a TV channel corresponding to a current channel on which the program is being viewed on the TV based on the transmitted information to display an image based on a signal which is received at the selected TV channel.

15. The TV according to claim 14, further comprising an input unit which receives the linkage-viewing command.

16. The TV according to claim 15, further comprising a remote control unit to wirelessly control the TV main body, wherein the input unit is provided in the remote control unit.

17. The TV according to claim 16, wherein the input unit comprises an existing button provided in the remote control unit.

18. The TV according to claim 14, wherein the controller determines whether the linkage viewing command is received through the mobile communication apparatus.

19. The TV according to claim 14, wherein the controller determines whether a signal is received from the mobile communication apparatus when the TV is in a state of power off and turns on power of the TV if the signal is received.

20. A system comprising:

a mobile communication apparatus which receives information on a program from a TV according to an input of the linkage-viewing command; and a TV which receives a signal of a TV channel, displays a program of the TV channel on the TV based on the received signal, and transmits information on the program to the mobile communication apparatus, wherein the mobile communication apparatus selects a TV channel corresponding to a current channel on which the program is being viewed on the TV based on the transmitted information to display an image based on a signal which is received at the selected TV channel.

21. A method of controlling a system including a mobile communication apparatus and a TV, the method comprising:

receiving at the TV a signal of a TV channel;

displaying a program of the TV channel on the TV;

transmitting information on the program from the TV to the mobile communication apparatus according to an input of the linkage-viewing command;

receiving at the mobile communication apparatus the information from the TV; and selecting at the mobile communication apparatus a TV channel corresponding to a current channel on which the program is being viewed on the TV based on the transmitted information to display an image based on a signal which is received at the selected TV channel.

22. A mobile communication apparatus comprising:

a display unit which displays a program;

a transmission unit; and a controller which determines whether a linkage-viewing command is received in order to linkage view the program which is being displayed on the display unit, and controls the transmission unit to transmit information on the program to a digital TV such that the digital TV selects a content corresponding to the program displayed on the display unit based on the transmitted information on the program to display the content, the content being received from an external device independently of the mobile communication apparatus.

23. The mobile communication apparatus according to claim 22, wherein the information on the program comprises at least one of broadcasting station information and channel information of the program.

24. The mobile communication apparatus according to claim 22, wherein the content is selected by the digital TV by selecting a TV channel.

25. The mobile communication apparatus according to claim 22, wherein the external device comprises a broadcasting station.

26. A mobile communication apparatus comprising:

a display unit which displays a content;

a transmission unit; and a control unit which determines whether a linkage-viewing command is received in order to linkage view the content which is being displayed on the display unit, and controls the transmission unit to transmit information on the content to a digital TV such that the information is usable by the digital TV to provide a corresponding content on the digital TV, the corresponding content being received from an external device independently of the mobile communication apparatus.

27. The mobile communication apparatus according to claim 26, wherein the information on the content comprises at least one of broadcasting station information and channel information of the content.

28. The mobile communication apparatus according to claim 26, wherein the content is selected by the digital TV by selecting a TV channel.

29. The mobile communication apparatus according to claim 26, wherein the external device comprises a broadcasting station.

* * * * *